US011687875B2

(12) United States Patent
Adulyasak et al.

(10) Patent No.: US 11,687,875 B2
(45) Date of Patent: *Jun. 27, 2023

(54) DISTRIBUTION-INDEPENDENT INVENTORY APPROACH UNDER MULTIPLE SERVICE LEVEL TARGETS

(71) Applicant: Blue Yonder Group, Inc., Scottsdale, AZ (US)

(72) Inventors: Yossiri Adulyasak, Montreal (CA); Thierry Moisan, Quebec (CA); Eric Prescott-Gagnon, Montreal (CA)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/224,461

(22) Filed: Apr. 7, 2021

(65) Prior Publication Data
US 2021/0224732 A1 Jul. 22, 2021

Related U.S. Application Data

(63) Continuation of application No. 15/011,953, filed on Feb. 1, 2016, now Pat. No. 10,977,609.

(60) Provisional application No. 62/175,404, filed on Jun. 14, 2015.

(51) Int. Cl.
*G06Q 10/087* (2023.01)
*G06Q 30/0202* (2023.01)

(52) U.S. Cl.
CPC ....... *G06Q 10/087* (2013.01); *G06Q 30/0202* (2013.01)

(58) Field of Classification Search
CPC .................. G06Q 10/087; G06Q 30/0202
See application file for complete search history.

(56) References Cited

U.S. PATENT DOCUMENTS

| 6,144,945 | A | 11/2000 | Garg et al. |
|---|---|---|---|
| 6,922,593 | B2 | 7/2005 | Weiss |
| 7,117,130 | B1 | 10/2006 | Megiddo |
| 7,433,742 | B2 | 10/2008 | Weiss |
| 10,572,890 | B2 | 2/2020 | Lederman et al. |
| 2015/0066569 | A1 | 3/2015 | Ervolina et al. |

OTHER PUBLICATIONS

Nicolas Chapados. Effective bayesian modeling of groups of related count time series. In Proceedings of the 31st International Conference on Machine Learning, pp. 1395-1403, 2014.

Justin A Boyan and Michael L Littman. Exact solutions to time-dependent mdps. 2000.

(Continued)

*Primary Examiner* — Andre D Boyce
(74) *Attorney, Agent, or Firm* — Spencer Fane LLP; Steven J. Laureanti (57) ABSTRACT

A system and method are disclosed for an inventory planner that generates an inventory policy using any form of demand distributions, non-linear cost functions and/or multiple target measures of service levels, while taking into account a supply order lead time, such as, for example, a static or stochastic supply order lead time. The inventory policy generated by the inventory planner comprises an optimal and reproducible solution to one or more supply chain planning problems.

18 Claims, 2 Drawing Sheets

(56) References Cited

OTHER PUBLICATIONS

Richard Ehrhardt. (s, s) policies for a dynamic inventory model with stochastic lead times. Operations Research, 32(1):121-132, 1984.

Awi Federgruen and Paul Zipkin. An efficient algorithm for computing optimal (s, s) policies. Operations research, 32(6):1268-1285, 1984.

Konstantinos V Katsikopoulos and Sascha E Engelbrecht. Markov decision processes with delays and asynchronous cost collection. Automatic Control, IEEE Transactions on, 48(4):568-574, 2003.

Jack PC Kleijnen and PJ Rens. Impact revisited: a critical analysis of IBM's inventory package impact. Production and Inventory Management, Journal of the American Production and Inventory Control Society, 19(1):71-90, 1978.

Jing-Sheng Song. The effect of leadtime uncertainty in a simple stochastic inventory model. Management Science, 40(5):603-613, 1994.

Hisashi Kurata et al, Optimal promotion planning—depth and frequency—for atwo-stage supply chain under Markov switching demand, European Journal of Operational Research 177 (2007) 1026-1043 (Year: 2007).

DISTRIBUTION-INDEPENDENT INVENTORY APPROACH UNDER MULTIPLE SERVICE LEVEL TARGETS

CROSS-REFERENCE TO RELATED APPLICATIONS

This application is a continuation of U.S. patent application Ser. No. 15/011,953, filed on Feb. 1, 2016, entitled "Distribution-Independent Inventory Approach Under Multiple Service Level Targets," which claims the benefit under 35 U.S.C. § 119(e) to U.S. Provisional Application No. 62/175,404, filed Jun. 14, 2015, and entitled "A Distribution-Independent Inventory Optimization Approach under Multiple Service Level Targets." U.S. patent application Ser. No. 15/011,953 and U.S. Provisional Application No. 62/175,404 are assigned to the assignee of the present application.

TECHNICAL FIELD

The disclosure relates generally to a system and method of supply chain inventory management, and more particularly, to a system and method of generating an inventory policy.

BACKGROUND

Supply chain inventory management involves developing an inventory policy that aims to minimize the total cost of activities related to inventory and replenishment by determining when to order an item and what quantities should be placed in the order. An inventory policy may be assessed by service level targets because the execution of a good inventory policy will result in an actual service level meeting or exceeding one or more predefined target service levels. To determine a target service level, an enterprise must consider projected demand and costs. Predicting a service level is similar to predicting the probability of being in a future state after some number of periods, or even an infinite number of periods. However, predicting an inventory policy while taking into account non-standard demand distributions, uncertain lead times, complex cost functions, and multiple target service levels is difficult to efficiently or accurately accomplish. Therefore, previous methods of determining inventory policies while attaining a target service level have proven inadequate.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 1:
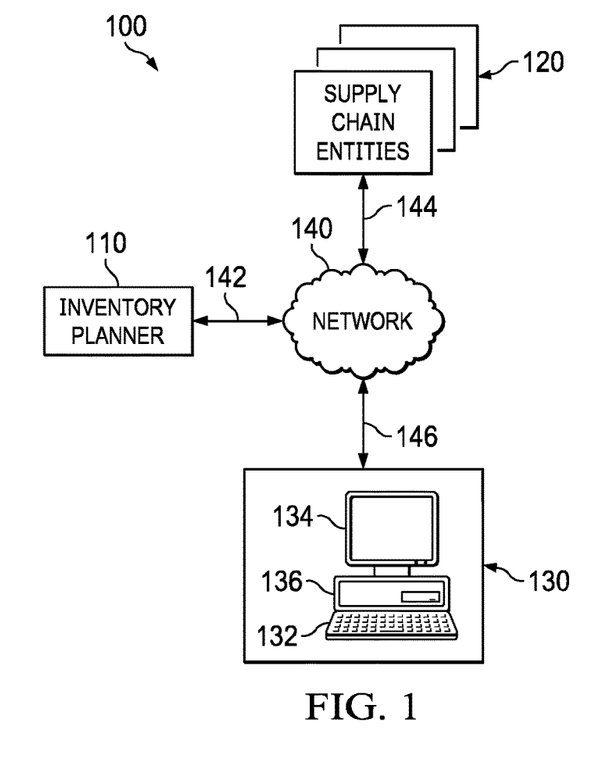
FIG. 1 illustrates an exemplary supply chain network according to a first embodiment.

FIG. 1 illustrates an exemplary supply chain network 100 according to a first embodiment. Supply chain network 100 comprises an inventory planner 110, one or more supply chain entities 120, computers 130, a network 140, and communication links 142, 144, and 146. Although a single inventory planner 110, one or more supply chain entities 120, a single computer 130, and a single network 140, are shown and described; embodiments contemplate any number of inventory planners 110, any number of supply chain entities 120, any number of computers 130, or any number of networks 140, according to particular needs.

In one embodiment, inventory planner 110 generates an inventory policy using one or more demand distributions, non-linear cost functions and/or target service levels, while taking into account a static or stochastic supply order lead time.

Supply chain network 100 may operate on one or more computers 130 that are integral to or separate from the hardware and/or software that support inventory planner 110 and one or more supply chain entities 120. Computers 130 may include any suitable input device 132, such as a keypad, mouse, touch screen, microphone, or other device to input information. An output device 134 may convey information associated with the operation of supply chain network 100, including digital or analog data, visual information, or audio information. Computers 130 may include fixed or removable non-transitory computer-readable storage media, such as magnetic computer disks, CD-ROM, or other suitable non-transitory computer-readable storage media to receive output from and provide input to supply chain network 100. Computers 130 may include one or more processors 136 and associated memory to execute instructions and manipulate information according to the operation of supply chain network 100.

Although a single computer 130 is shown and described in FIG. 1, inventory planner 110 and one or more supply chain entities 120 may each operate on separate computers 130 or may operate on one or more shared computers 130. Each of the one or more computers 130 may be a work station, personal computer (PC), network computer, tablets, notebook computer, personal digital assistant (PDA), cell phone, smartphone, telephone, wireless data port, or any other suitable computing device. In an embodiment, one or more users may be associated with inventory planner 110. These one or more users may include, for example, a "manager" or a "planner" handling generating inventory policies and/or one or more related tasks within supply chain network 100. In addition, or as an alternative, these one or more users within supply chain network 100 may include, for example, one or more computers 130 programmed to autonomously handle, among other things, generating an inventory policy, forecasting a demand, and adjusting of various levels of manufacturing and inventory based, at least in part, on the inventory policy and/or one or more related tasks within supply chain network 100.

As an example only and not byway of limitation, one or more supply chain entities 120 may represent one or more supply chain entities, such as, for example, suppliers, manufacturers, distribution centers, retailers (including online retailers) and/or customers. A supplier may be any suitable entity that offers to sell or otherwise provides one or more items (i.e., materials, components, or products) to one or more manufacturers. In addition, or as an alternative, each of the one or more items may be represented in supply chain network 100 by an identifier, including, for example, Stock-Keeping Unit (SKU), Universal Product Code (UPC) information, or a barcode, tag, RFID, or any other device that encodes such identifying information.

A manufacturer may be any suitable entity that manufactures at least one product. Manufacturer may use one or more items during the manufacturing process to produce any manufactured, fabricated, assembled, or otherwise processed and tangible item, material, component, good or product. In one embodiment, a product represents an item ready to be supplied to, for example, another supply chain entity in one or more supply chain entities 120, such as a supplier, an item that needs further processing, or any other item. A manufacturer may, for example, produce and sell a product to one or more suppliers, another manufacturer, one or more distribution center, one or more retailers, a customer, or any other suitable person or entity. A distribution center may be any suitable entity that offers to store or otherwise distributes at least one product to one or more retailers and/or customers. A retailer may be any suitable entity that obtains one or more products to sell to one or more customer, whether as a brick and mortar retailer or an online retailer.

Although one or more supply chain entities 120 is shown and described as separate and distinct entities, the same entity may simultaneously act as any one of the one or more supply chain entities 120. For example, one or more supply chain entities 120 acting as manufacturer can produce a product, and the same entity can act as supplier to supply an item to itself or another supply chain entity. In addition, or as an alternative, embodiments contemplate any number of suppliers, manufactures, distribution centers and retailers, according to particular needs. Although one example of a supply chain network 100 is shown and described, embodiments contemplate any operational environment and/or supply chain network 100, without departing from the scope described herein.

In one embodiment, inventory planner 110 is coupled with network 140 using communications link 142, which may be any wireline, wireless, or other link suitable to support data communications between inventory planner 110 and network 140 during operation of supply chain network 100. One or more supply chain entities 120 are coupled with network 140 using communications link 144, which may be any wireline, wireless, or other link suitable to support data communications between one or more supply chain entities 120 and network 140 during operation of supply chain network 100. Computers 130 are coupled with network 140 using communications link 146, which may be any wireline, wireless, or other link suitable to support data communications between computers 130 and network 140 during operation of supply chain network 100.

Although communication links 142, 144, and 146, and are shown as generally coupling inventory planner 110, one or more supply chain entities 120, and computers 130 to network 140, inventory planner 110, one or more supply chain entities 120, and computers 130 may communicate directly with inventory planner 110, one or more supply chain entities 120, and computers 130, according to particular needs.

In another embodiment, network 140 includes the Internet and any appropriate local area networks (LANs), metropolitan area networks (MANs), or wide area networks (WANs) coupling inventory planner 110, one or more supply chain entities 120, and computers 130. For example, data may be maintained by inventory planner 110 at one or more locations external to inventory planner 110 and one or more supply chain entities 120 and made available to one or more associated users of one or more supply chain entities 120 using network 140 or in any other appropriate manner. Those skilled in the art will recognize that the complete structure and operation of communication network 140 and other components within supply chain network 100 are not depicted or described. Embodiments may be employed in conjunction with known communications networks 140 and other components.

In accordance with the principles of embodiments described herein, inventory planner 110 may generate an inventory policy for inventory of one or more supply chain entities 120 in supply chain network 100. Furthermore, inventory planner 110 may adjust product mix ratios, inventory levels at various stocking points, production of products of manufacturing equipment, and proportional or alternative sourcing of one or more supply chain entities 120 based on one or more generated inventory policies.

According to some embodiments, inventory planner 110 generates an inventory policy based on an item demand distribution for a given cost function. According to these embodiments, when the inventory quantity of an item reaches a quantity s or lower, the item may be resupplied to reach a target quantity of S. The cost function may include, but is not restricted to, inventory costs, order costs and backorder costs. In addition, or as an alternative, the cost function may be complex and include, for example, step function costs and other non-linear costs functions of inventory and order quantities.

According to an embodiment, inventory planner 110 receives a discrete demand probability distribution for one or more items and a set of related cost values. Inventory planner 110 may then determine an inventory policy that minimizes costs based on the received demand distribution for every period of a planning horizon that meets one or more service level targets.

Service level targets may include a set of service level targets based on different possible measures of service level, such as, for example, the probability of satisfying the entire demand during a period and the fraction of demand that would be satisfied. In addition, or as an alternative, during the solution process, a negative difference with the targeted service level may be penalized.

According to embodiments, inventory planner 110 models a supply chain resupply problem as a Markov decision process (MDP) where the model comprises transition matrices and reward matrices. Embodiments of the disclosed system and method utilize linear programming (LP) and mixed integer linear programming (MILP) models to solve variants of the MDP models for inventory policies. Variants of MDP models permit planning for an infinite horizon MDP with seasonality and time steps, and an infinite horizon MDP model with no seasonality. Infinite horizon MDP with seasonality may comprise a dynamic policy (including, for example, one policy per season) and/or a static policy (including, for example, one policy for more than one, or all, seasons).

To further explain the operation of the disclosed system, an example of a simplified inventory planning problem is now given. In the following exemplary embodiment, the simplified inventory planning problem may comprise a household's decision to purchase milk for breakfast. The milk represents an exemplary item in a supply chain inventory. According to this example, an individual wants to purchase some milk (but not too much milk) so that the individual's household will be supplied each morning with milk for breakfast cereal. In this example, milk represents an item in inventory. The individual represents a supply chain entity, such as a buyer. The time it takes to buy the milk represents the leadtime. And the storage of the milk in the refrigerator represents storage and/or carrying costs. For example, due to limited storage space at a warehouse (represented, in this example, by a refrigerator), storing too much milk in the refrigerator may prevent the storage of other items in the warehouse (such as other food items), which represents the storage and/or costs.

In order to solve this simplified inventory planning problem, inventory planner 110 takes into account the past habits of the household and/or individual, such as the probability of drinking milk at different periods, and assigning a cost to each of: buying milk (representing an order), losing some milk (representing waste), and not having enough milk (representing a stockout). Based on these input variables, comprising demand probabilities and costs, inventory planner 110 may find a buying policy, such as a milk buying policy, at each period. Such a milk buying policy may comprise, for example, when the inventory of milk contains s or less items and when an order is made to reach level S.

Figure 2:
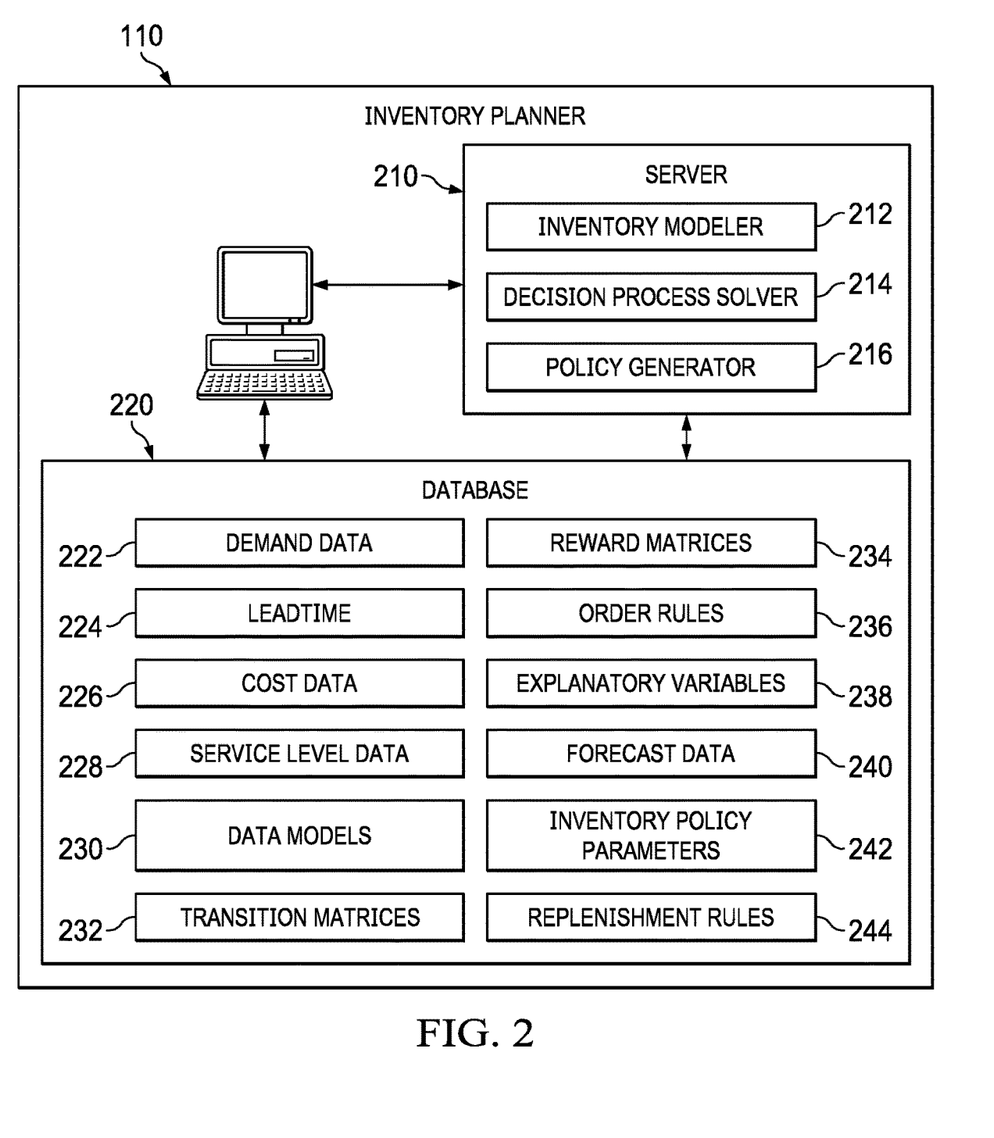
FIG. 2 illustrates the inventory planner of FIG. 1 in greater detail in accordance with the first embodiment.

FIG. 2 illustrates inventory planner 110 of FIG. 1 in greater detail in accordance with the first embodiment. As discussed above, inventory planner 110 comprises one or more computers at one or more locations including associated input devices, output devices, non-transitory computer-readable storage media, processors, memory, or other components for receiving, processing, storing, and communicating information according to the operation of supply chain network 100. As discussed in more detail below, inventory planner 110 comprises one or more of computers, server 210, and database 220. Although inventory planner 110 is shown as comprising a single computer, server 210 and database 220; embodiments contemplate any suitable number of computers, servers or databases internal to or externally coupled with inventory planner 110. In addition, or as an alternative, inventory planner 110 may be located internal to one or more retailers of one or more supply chain entities 120. In other embodiments, inventory planner 110 may be located external to one or more retailers of one or more supply chain entities 120 and may be located in for example, a corporate retailer of the one or more retailers, according to particular needs.

Server 210 comprises inventory modeler 212, decision process solver 214, and inventory policy generator 216. Although server 210 is shown and described as comprising a single inventory modeler 212, decision process solver 214, and inventory policy generator 216, embodiments contemplate any suitable number or combination of these located at one or more locations, local to, or remote from inventory planner 110, such as on multiple servers or computers at any location in supply chain network 100.

Database 220 comprises one or more databases or other data storage arrangement at one or more locations, local to, or remote from, server 210. Database 220 comprises, for example, demand data 222, leadtime data 224, cost data 226, service level data 228, data models 230, transition matrices 232, reward matrices 234, order rules 236, explanatory variables 238, forecast data 240, inventory policy parameters 242 and replenishment rules 244. In one embodiment, database 220 stores supply chain data, including one or more inventory planning problems of supply chain network 100 that may be used by server 210. Although, database 220 is shown and described as comprising demand data 222, leadtime data 224, cost data 226, service level data 228, data models 230, transition matrices 232, reward matrices 234, order rules 236, explanatory variables 238, forecast data 240, inventory policy parameters 242 and replenishment rules 244, embodiments contemplate any suitable number or combination of these, located at one or more locations, local to, or remote from, inventory planner 110 according to particular needs.

In one embodiment, inventory modeler 212 models an inventory planning problem as a decision process according to data models 230 and generates transition matrices 232 and reward matrices 234 based at least in part on received demand data 222, leadtime data 224, cost data 226, and/or service level data 228. In addition, or as an alternative, inventory modeler 212 models the supply chain planning problem as a MDP. According to an embodiment, a MDP is a dynamic programming algorithm characterized by a discrete time period and a stochastic transition over discrete demand distributions.

Decision process solver 214 may receive transition matrices 232 and reward matrices 234 as inputs and generate a decision process solution modeled according to data models 230. According to an embodiment, the decision process is solved by linear programming (LP), and/or mixed-integer linear programming (MILP) solvers.

Inventory policy generator 216 may comprise one or more modules of inventory planner 110 that generate an inventory policy from the decision process solution generated by the decision process solver 214 for a single item in each location. The generated inventory policy may include one or more performance measures such as stockout probability, fulfillment level, waiting time, maximum backlog quantity, and/or a number of orders. According to an embodiment, policy generator 216 produces an (s, S) resupply policy that indicates, when an inventory quantity reaches the quantity of s, it should be resupplied to reach a quantity of S.

In one embodiment, demand data 222 of database 220 may comprise for example, any data relating to past sales, past demand, purchase data, promotions, events, or the like of one or more supply chain entities 120. Demand data 222 may be stored at time intervals such as, for example, by the minute, hour, daily, weekly, monthly, quarterly, yearly, or any suitable time interval, including substantially in real time. According to embodiments, demand data 222 includes a demand function, comprising demand values and probabilities. For a historical demand, a demand function may comprise probabilities calculated from a frequency associated with demand value for one or more time steps. According to some embodiments, the demand function comprises a slow mover predictive model which comprises a distributional forecast.

Leadtime data 224 of database 220 may comprise discrete leadtime distributions or historical leadtimes of one or more items of supply chain entities 120. Leadtime data 224 may represent the time elapsing from when an order for the item is communicated to one or more supply chain entities 120 until the item is received in an inventory. According to embodiments, leadtime data 224 comprises a leadtime function comprising lead time values and probabilities associated with each lead time value for one or more time steps.

According to embodiments, inventory planner 110 receives demand data 222 and leadtime data 224 and generates transition matrices 232. Demand data 222 and leadtime data 224 may comprise various forms of standard or non-standard distributions. As an example only and not by way of limitation, inventory planner 110 may generate an inventory policy for standard or non-standard historical demand and lead-time or other non-standard uncertainty distributions. Examples of historical demand that do not follow standard distributions include, but are not limited to, slow moving items that have a large number of zero demand and items with lumpy demand patterns.

Cost data 226 may comprise any one or more general cost components of one or more items in supply chain network 100, such as, for example, batch costs, stock out costs, inventory costs, order costs, backorder costs, and backlog costs. In addition, or as an alternative, the cost function may be complex, such as for example, step-size cost functions of inventory and order quantities and other non-linear costs functions of inventory and order quantities. A step-size cost function may comprise a cost related to each block of a group of items. For example, given a group of items that are sold in blocks of 100 or less, 105 items would cost the same as 115 items, but 205 items would cost more. A non-linear cost function may comprise, for example, a quadratic function of the inventory quantity and order quantity. According to some embodiments, cost data 226 comprises an assigned cost associated with a service level target that are incorporated into reward matrices 234. A non-linear cost function may be useful when a fixed cost is associated with a certain level of inventory quantity (for example, a physical storage has a fixed bin size and an inventory holding cost is a fixed cost per bin) or when an inventory cost increases exponentially because the capacity of the physical storage reaches the effective capacity level, and it becomes more difficult to operate, thereby significantly reducing the operational efficiency.

According to embodiments, cost data 226 may comprise a cost parameter $c_{iq}^t$, associated with an inventory level i, order quantity q, at a time step t. For example, according to embodiments, cost parameter $c_{iq}^t$ may be calculated from one or more cost components according to:

$$c_{iq}^t = \varrho_i^t + v_q^t - \rho_s \cdot \min\{i, 0\}$$

where, $\varrho_i^t$ is an inventory cost at time step t as a function of inventory level i;

$v_q^t$ is an order cost at time step t as a function of order quantity q; and $\rho_s$ is a stockout cost per unit of one or more products.

In addition, or as an alternative, embodiments contemplate cost functions comprising any function of order quantity q without further modification. By way of example and not limitation, cost function may comprise a step-size cost function, such as, for example, a ceiling function:

$$v_q^t = \left\lceil \frac{q}{v} \right\rceil u$$

where, cost increases by u, for every group of items v ordered.

Service level data 228 comprises data of one or more service level targets. Service level targets may comprise any suitable service level target, such as, for example, a stockout probability, fulfillment level, expected wait time and/or average stock on hand. Particular examples of service level targets stored in database 220 may comprise, for example, a stockout probability less than or equal to 10%, a fulfillment level (by quantity) greater than or equal to 5%; an expected wait time less than or equal to 2 days; and/or an average stock on hand greater than or equal to an expected "positive" demand. Although, particular service level targets are described; embodiments contemplate any service level target, according to particular needs.

In addition, or as an alternative, service level targets may be implemented as a cost in cost data 226 in order to generate a penalty in determining an inventory policy.

According to embodiments, one or more service level targets are modeled as costs by associating a sufficiently large penalty when a service level fails to meet service level target, thereby enforcing these constraints in the inventory policy. These costs may be used to determine if an order quantity (action) associated with an inventory level (state) would satisfy one or more predetermined service level targets. According to some embodiments, service level targets are implemented into cost data 226 as one or more of a stockout probability, maximum backlog quantity, and/or a fulfillment level.

According to an embodiment, a stockout probability may be calculated according to a transition matrix that describes the probability of an item in an inventory moving from a first state to a second or more states. According to the matrix, as will be explained more fully below, one matrix per order action q is defined because the action changes the probability of transition between states. Each pair of state and order action is associated to a vector of probabilities of transition to another state. By summing the probabilities over one or more backlog states, the stockout probability for an initial state i and order quantity q combination is determined. When the probability of a stockout is more than 1 minus the target service level, a large penalty may be added to the cost parameter, $c_{iq}^t$.

Additionally, or in the alternative, a service level target may represent a maximum backlog quantity. According to embodiments, a maximum backlog quantity may be generated for each state i and order action q. Using a vector of transition probabilities, the expected backlog quantity may be generated by averaging the backlog quantity corresponding to each stockout state weighted by a probability of moving into a corresponding state. When the expected backlog quantity is greater than the target maximum backlog quantity, a large penalty may be added to the cost parameter $c_{iq}^t$.

According to further embodiments, a service level target may comprise a fulfillment level, which may represent the proportion of the demand that is to be satisfied. An expected fulfillment quantity may comprise for example, the expected demand minus the expected backlog quantity. The fulfillment level may be obtained by dividing the expected fulfillment quantity by the expected demand. The expected backlog quantity computed for the maximum backlog quantity may also be used to determine if an action q associated with a state i satisfies the fulfillment level. The expected backlog quantity may then be converted into an expected fulfillment level. If the expected fulfillment level is less than a targeted fulfillment level, a large penalty may be added to the cost parameter $c_{iq}^t$.

As an example only and not byway of limitation, inventory planner 110 may set a preferred service level target. Inventory modeler 212 may associate each service level target with a cost that may be incorporated into reward matrices 234, such that a penalty is applied when an inventory policy comprises a service level different than a target service level. According to some embodiments, a higher service level may be preferred to a lower service level when compared to the target service level. In other words, missing more sales than set in a service level target may be worse than having excess inventory, because excess inventory may carry lower costs than missed sales. For example, if the service level target is 95%, then a service level of 96% may be preferred to a service level 94%. This concept may be included in the reward matrix by applying a larger penalty if the service level is under the target service level, than if the service level is over the target service level. According to some embodiments, a penalty is set equivalent to the distance from the target service level. In this manner, inventory planner 110 may impose multiple target service levels using a similar treatment. According to an embodiment, inventory planner 110 generates an inventory policy that satisfies multiple service level targets.

Data models 230 may comprise any suitable model of the described data stored in database 220. Transition matrices 232 may comprise one or more mathematical matrices or data structures that comprises data generated by inventory modeler 212 that defines the probability of moving from each possible inventory state to another during a period. Reward matrices 234 may comprise one or more mathematical matrices or data structures that comprises data generated by inventory modeler 212 that defines the cost associated with each inventory state and the order action taken during a period. According to an embodiment, the costs of the reward matrix is a function of the state and period and can be defined in any form such as, for example, a linear function or a non-linear function, such as, for example, a step function.

Transition matrices 232 and reward matrices 234 are used by decision process solver 214 to generate a decision process solution based on one or more of demand data 222, leadtime data 224, cost data 226, and service level data 228. A decision process solution may then be used by policy generator 216 to generate an inventory policy.

Order rules 236 may comprise one or more rules or limits on setting an inventory policy, including, but not limited to, a minimum order quantity, a maximum order quantity, a discount, and a step-size order quantity, and batch quantity rules. According to an embodiment, inventory planner 110 generates an inventory policy when based, at least in part, on order rules 236.

Explanatory variables 238 may comprise data relating to specific past, current, or future indicators and data of promotions, seasonality, special events (such as sporting events), weather, and the like. According to some embodiments, inventory planner 110 accesses and stores explanatory variables 238 in the database. These explanatory variables may be used to create time dependent cost parameters and transition matrices that are consumed by a time dependent model.

In one embodiment, inventory planner 110 stores forecast data 240 in database 220. Forecast data 240 may comprise data relating to a forecast generated by inventory planner 110 in response to historical data 222 and explanatory variables 238 according to data models 230. Forecast data 240 may include, for example, future predicted sales, future predicted demand, replenishment quantity of inventory, parameters of the distributional forecasts, and any data or representations of data (such as graphs, charts, tables, matrices, and the like) generated by inventory planner 110 from historical data 222, according to particular needs.

Inventory policy parameters 242 are calculated by inventory planner 110 from a forecasted demand to ensure that a service level of one or more supply chain entities 120 is met with a certain probability. Inventory policy parameters 242 may comprise any suitable service level target, as described above. According to some embodiments, one or more supply chain entities 120 set a service level at 95%, meaning supply chain entities 120 will set the desired inventory stock level at a level that meets demand 95% of the time. Although, a particular service level percentage is described; embodiments contemplate any service level, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, inventory planner 110 generates a replenishment order according to one or more replenishment rules 244, which, among other things, indicates to one or more supply chain entities 120 to generate or receive inventory to replace depleted inventory. Replenishment rules 234 may indicate that, for example, when a specified condition occurs, a supplier or distribution center is directed to ship one or more products, a manufacturer is directed to manufacture one or more products, and/or a retailer is directed to receive one or more products to replenish a depleted inventory.

Figure 3:
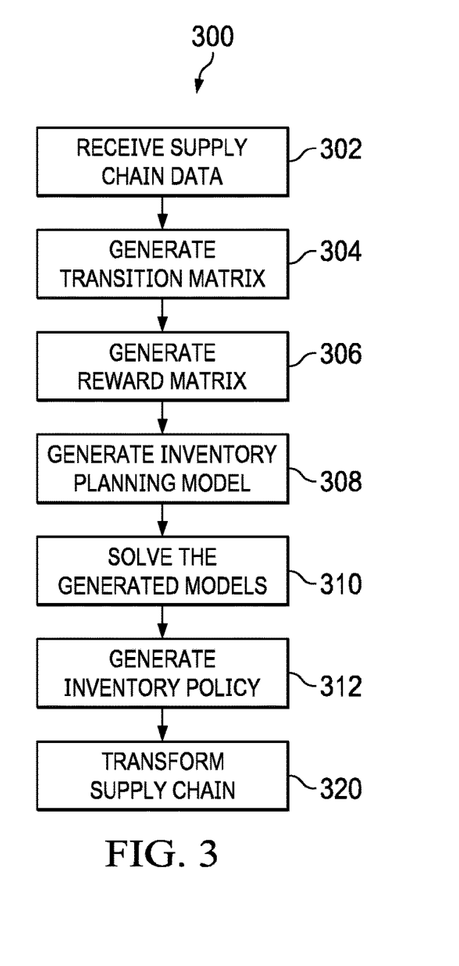
FIG. 3 illustrates an exemplary method of generating an inventory policy by the inventory planner of FIG. 1 in accordance with an embodiment.

FIG. 3 illustrates an exemplary method 300 of generating an inventory policy by inventory planner 110 according to an embodiment. Method 300 proceeds by one or more activities, which although described in a particular order may be performed in one or more permutations, according to particular needs. According to some embodiments, method 300 generally assumes that an additional order cannot be placed if there exists already an order in-transit. However, embodiments contemplate relaxing this assumption by adding any in-transit quantity orders of one or more items to a projected inventory quantity in future periods and generating an inventory policy based on the new quantity. Furthermore, depending on the inventor planning model, method 300 may generate an inventory policy for each time step, or by utilizing one or more additional constraints and integer variables, method 300 may generate a consistent inventory policy across multiple time steps.

Method 300 of generating an inventory policy begins at activity 302 where inventory planner 110 receives demand probabilities or a demand distribution from demand data 222 for a given item including a set of cost values. Further, inventory planner 110 may receive and utilize demand data 222, leadtime data 224, cost data 226, service level data 228, and/or other data from database 220.

At activity 304, inventory modeler 212 of inventory planner 110 generates a transition matrix based on the received demand data 222. According to an embodiment, the states of the generated transition matrix comprise the possible number of items in the inventory at each period and the demands that cannot be satisfied (or are backlogged) are represented by negative inventory quantities. The infinite MDP model may comprise additional states, called absorbing states, which prevent an inventory state that is larger than the capacity of the inventory or an unacceptable stockout level. According to an embodiment, the absorbing states comprise states of the supply chain system which are impossible to reach and no action has any impact on these states. The only transition permitted on the absorbing states is to stay in the state. A large negative reward (penalty) may be associated with the absorbing states to ensure the MDP solution has no advantage to end in those states.

As an example only and not by way of limitation, beginning with the set, $P'=[-b, \ldots, 0, \ldots, u, u+1]$, is the set of inventory states associated with the demand lead time l, where b is the maximum backlog possible (equal to the maximum ordering quantity for one period), and u is the maximum inventory quantity, the transition matrix states are equal to P. The additional state after u is an absorbing state, which may be associated with a high penalty that limits the size of the inventory. For simplicity, the absorbing state for an unacceptable backlog level is not illustrated in the example given here. From a demand probability distribution of size b+1 ranging from 0 to b, the matrix may be constructed with the following assumptions.

The probability of staying in state s is equal to the probability of not having any demand. The probability of moving from state s to s−d is equal to the probability of having a demand of d items during a single time step. Moving from state $s_1$ to $s_2$ where $s_1 < s_2$ is impossible if no order is made.

Let i be a state of the inventory. The possible order quantities may be represented by the set Q and the maximum ordering quantity is equal to $q^{max}=\max_{q \in Q}$. An example of discrete demand probabilities is shown in Equation 1.

$$\begin{array}{cc} 0 & 1 \\ [0.87 & 0.13] \end{array} \quad (1)$$

According to the example in Equation 1, during a time step, there is a probability of 0.87 to have no demand and a probability 0.13 to have one demand. Based on these probabilities, the resulting transition matrix, if no order is made (i.e. q=0) is equal to Matrix 2.

$$P_0^1 = \begin{array}{c} -2 \\ -1 \\ 0 \\ 1 \\ 2 \\ 3 \\ 4 \\ 5 \end{array} \begin{bmatrix} -2 & 1 & 0 & 1 & 2 & 3 & 4 & 5 \\ 0 & 0.13 & 0.87 & 0 & 0 & 0 & 0 & 0 \\ 0 & 0.13 & 0.87 & 0 & 0 & 0 & 0 & 0 \\ 0 & 0.13 & 0.87 & 0 & 0 & 0 & 0 & 0 \\ 0 & 0 & 0.13 & 0.87 & 0 & 0 & 0 & 0 \\ 0 & 0 & 0 & 0.13 & 0.87 & 0 & 0 & 0 \\ 0 & 0 & 0 & 0 & 0.13 & 0.87 & 0 & 0 \\ 0 & 0 & 0 & 0 & 0 & 0.13 & 0.87 & 0 \\ 0 & 0 & 0 & 0 & 0 & 0 & 0 & 1 \end{bmatrix} \quad (2)$$

The resulting transition matrix when an order of one is made (i.e. q=1) is equal to Matrix 3.

$$P_1^1 = \begin{array}{c} -2 \\ -1 \\ 0 \\ 1 \\ 2 \\ 3 \\ 4 \\ 5 \end{array} \begin{bmatrix} -2 & 1 & 0 & 1 & 2 & 3 & 4 & 5 \\ 0 & 0 & 0.13 & 0.87 & 0 & 0 & 0 & 0 \\ 0 & 0 & 0.13 & 0.87 & 0 & 0 & 0 & 0 \\ 0 & 0 & 0.13 & 0.87 & 0 & 0 & 0 & 0 \\ 0 & 0 & 0 & 0.13 & 0.87 & 0 & 0 & 0 \\ 0 & 0 & 0 & 0 & 0.13 & 0.87 & 0 & 0 \\ 0 & 0 & 0 & 0 & 0 & 0.13 & 0.87 & 0 \\ 0 & 0 & 0 & 0 & 0 & 0 & 0 & 1 \\ 0 & 0 & 0 & 0 & 0 & 0 & 0 & 1 \end{bmatrix} \quad (3)$$

When the inventory is in a backlogged state (i<0), an order of $\max(q^{max},|i|)$ is made. According to embodiments, this forces the inventory to exit the backlogged state at each period or time step.

The reward matrix of activity 304 may be constructed differently depending on whether the lead time is deterministic or stochastic. A time dependent demand model may be used when an inventory problem comprises seasonality, while the stochastic lead time may still be taken into account by parameterizing transition probabilities. In a time independent model, transition probabilities may be aggregated over the stochastic lead time to a single matrix for each action state.

According to embodiments with a time dependent demand, the demand distribution of a stochastic distribution over l periods is generated by multiplying the transition matrix $P_0^1$ by itself l times. From the resulting matrix, any row where i≥0 may be used to obtain the demand distribution. By way of example and not by limitation, when the probabilities from Matrix 2 are aggregated over a lead time of two periods, inventory modeler 212 generates an aggregate demand function, Vector 4:

$$\begin{array}{ccc} 0 & 1 & 2 \\ [0.7569 & 0.2262 & 0.0169] \end{array} \quad (4)$$

From these probabilities and states, a transition Matrix 5, $P_0^2$, with no orders is generated.

$$P_0^2 = \begin{array}{c} -2 \\ -1 \\ 0 \\ 1 \\ 2 \\ 3 \\ 4 \\ 5 \end{array} \begin{bmatrix} -2 & 1 & 0 & 1 & 2 & 3 & 4 & 5 \\ 0.0169 & 0.2262 & 0.7569 & 0 & 0 & 0 & 0 & 0 \\ 0.0169 & 0.2262 & 0.7569 & 0 & 0 & 0 & 0 & 0 \\ 0.0169 & 0.2262 & 0.7569 & 0 & 0 & 0 & 0 & 0 \\ 0 & 0.0169 & 0.2262 & 0.7569 & 0 & 0 & 0 & 0 \\ 0 & 0 & 0.0169 & 0.2262 & 0.7569 & 0 & 0 & 0 \\ 0 & 0 & 0 & 0.0169 & 0.2262 & 0.7569 & 0 & 0 \\ 0 & 0 & 0 & 0 & 0.0169 & 0.2262 & 0.7569 & 0 \\ 0 & 0 & 0 & 0 & 0 & 0 & 0 & 1 \end{bmatrix} \quad (5)$$

For an order of one (q=1), the transition matrix, Matrix 6, is generated.

$$P_1^2 = \begin{matrix} -2 \\ -1 \\ 0 \\ 1 \\ 2 \\ 3 \\ 4 \\ 5 \end{matrix} \begin{bmatrix} -2 & 1 & 0 & 1 & 2 & 3 & 4 & 5 \\ 0 & 0.0169 & 0.2262 & 0.7569 & 0 & 0 & 0 & 0 \\ 0 & 0.0169 & 0.2262 & 0.7569 & 0 & 0 & 0 & 0 \\ 0 & 0.0169 & 0.2262 & 0.7569 & 0 & 0 & 0 & 0 \\ 0 & 0 & 0.0169 & 0.2262 & 0.7569 & 0 & 0 & 0 \\ 0 & 0 & 0 & 0.0169 & 0.2262 & 0.7569 & 0 & 0 \\ 0 & 0 & 0 & 0 & 0.0169 & 0.2262 & 0.7569 & 0 \\ 0 & 0 & 0 & 0 & 0 & 0 & 0 & 1 \\ 0 & 0 & 0 & 0 & 0 & 0 & 0 & 1 \end{bmatrix} \quad (6)$$

According to embodiments with a time independent demand, transition matrices associated with each lead time value may be further aggregated into a single transition matrix for each order quantity. By way of example not by limitation, stochastic leadtime may be incorporated through the transition matrix $P_0^1$, (Matrix 2) above. Assuming a leadtime of [(1, 0.5), (2, 0.3), (3, 0.2)], where a list of pairs matches each lead duration to a probability, then the demand probability may be generated by the following procedure with $P_0^1$ and the list of pairs as inputs:

```
Algorithm 1 Algorithm to compute
     the stochastic leadtime

1: procedure COMPUTE STOCHASTIC LEADTIME(P₀¹,
   stochastic_leadtime)
2:   for (l, leadtime_probability) ∈
     stochastic_leadtime do
3:     first_row ← (P₀¹)ˡ₁,ᵢ ∀i ∈ 1..|P₀¹|
4:     dₗ ← first_row · leadtime_probability
5:   end for
6:   return Σᵢ∈L dₗ
7: end procedure
``` where, for each pair, a set of demand probabilities may be retrieved from the first row of $P_0^{1^l}$, where l is the lead time duration. The new demand probability may then be generated as a weighted sum of the probability of each lead time duration.

Inventory modeler 212 generates one or more additional transition matrices for other items in supply chain network 100 according to particular needs. According to some embodiments, inventory modeler 212 uses a basic single-product model where all periods have the same discrete demands probabilities, which results in a Markov decision process over an infinite horizon.

At activity 306, inventory modeler 212 of inventory planner 110 generates a reward matrix based, at least in part, on one or more costs of cost data 226 which depend on an inventory state and an order action. According to an embodiment, for each action, inventory modeler 212 defines, in the reward matrix, a cost associated with each possible state, where a reward is the cost associated with each action in each state (i.e. inventory quantity) and penalties are associated with a service level violation. This cost is equal to the sum of all functions, such as inventory cost or backlog cost for this particular action and state. These functions take as input the action and inventory state and return an associated cost.

According to some embodiments, each action, $R_q$ is a reward matrix of size $|I^t| \times |T|$, which defines a cost for each inventory state i related to the ordering action q at time step t: $c_{iq}^t$, where T is the set of time steps and $I^t$ is a set of inventory levels in time step $t \in T$.

At activity 308, inventory planner 110 generates an inventory planning model. For the model described below, the following notation is used. Let, T be the set of time steps, $I^t$ is a set of inventory levels in time step $t \in T$, Q is the set of possible order quantity decisions, and $\Gamma^t$ is the set of time steps where the order made in the time step has a probability to arrive in period t. Additionally, the model may incorporate one or more of the following parameters. $c_{iq}^t$ is a cost at time step $t \in T$ of having the inventory on-hand level (quantity) $i \in I^t$ and making the order quantity decision $q \in Q$. $\phi^{h,t}(i|j, q)$ is the probability of moving from state j at time step h to state i at time step t when an order quantity q is made at time step $h \in \Gamma^t$ and arrives at time step t which results in the inventory level i, and $\Sigma_{t \in T} \Sigma_{h \in T} \Sigma_{i \in I^t} \Sigma_{j \in I^h} \phi^{h,t}(i|j, q)=1$. According to some embodiments, the model may incorporate one or more decision variables, such as for example, $x_{iq}^t$, the expected probability flow at time step $t \in T$ when the inventory on-hand equals $i \in I^t$ for order quantity decision q.

For inventory planning under a time dependent demand, inventory planner 110 may begin with the following model, the solution of which represents the probability of being in a certain state and time step. The inventory policy extracted from the solution of this model is time-dependent, where the inventory policy may be different at each time step.

The objective function of the model minimizes the expected total cost according to:

$$\min \sum_{t \in T} \sum_{i \in I^t} \sum_{q \in Q} c_{iq}^t x_{iq}^t \quad (7)$$

Constraint 8 controls the transitions between states and time steps.

$$\sum_{q \in Q} x_{iq}^t - \sum_{j \in I^h, q \in Q, h \in \Gamma^t} \phi^{h,t}(i|j, q) x_{jq}^h = 0 \quad \forall i \in I, \forall t \in T \quad (8)$$

Constraint 9 ensures that the maximum flow in the system is one.

$$\sum_{i \in I^t} \sum_{q \in Q_i^t} x_{iq}^t = 1 \quad \forall t \in T \quad (9)$$

Constraint 10 is a non-negativity constraint.

$$x_{iq}^t \geq 0 \quad \forall i \in I, \forall q \in Q, \forall t \in T \quad (10)$$

According to some embodiments, the above model may be extended when consistent inventory policies across time steps are required that potentially have different demand probabilities. To generate a stationary policy, one or more of the following parameters, sets, and variables may be added to the model. According to embodiments, a parameter M represents an upper bound on the number of time steps, which may be set, for example, to |T|. A set K represents the set of subsets of T (time step partition), where the inventory policy is consistent in all time steps in the same partition and there is no overlapping between the time step partitions (i.e. ∩ K=∅. A set $R_k$ represents a set of possible values of a reorder point associated with the time step partition index k. A set $C_k$ represents an inventory target level associated with the time step partition index k. Additionally, the following variables may be defined. $y_k^r$ represents a binary variable that equals one when the reorder point r is chosen for the time step partition k, and is zero otherwise. $z_k^c$ represents a binary variable that equals one if the inventory target level c is chosen for the time step partition k, and is zero otherwise.

According to these parameters, sets, and variables, the following constraints may be added to the objective function model to produce a stationary policy for each time step partition.

$$\sum_{t\in k} x_{i0}^t \leq M \cdot (1 - y_k^r) \quad \forall k \in K, \forall r \in R_k, \forall i \in I | i \leq r \quad (11)$$

$$\sum_{t\in k} \sum_{q\in Q|q>0} x_{iq}^t \leq M \cdot (1 - y_k^r) \quad \forall k \in K, \forall r \in R_k, \forall i \in I | i > r \quad (12)$$

$$\sum_{t\in k} \sum_{q\in Q|q>0} \sum_{i|i+q\neq c} x_{iq}^t \leq M \cdot (1 - z_k^c) \quad \forall k \in K, \forall c \in C_k \quad (13)$$

Constraints (12) and (13) impose a consistent reorder point and target level across the time steps for each partition. When the reorder point $y_k^r$ is chosen, then the flow of not ordering is zero (constraint (11)), i.e. if the inventory is under the reorder point r, then no order may be made. Additionally, or in the alternative, when the reorder point $y_k^r$ is chosen, the flow of ordering any amount when the inventory is over the reorder point is zero (constraint (12)). Constraints (14) and (15) impose that one of $y_k^r$ and $z_k^c$ can be chosen for each time step partition.

According to some embodiments, when the inventory planning problem comprises a single demand function with no time step, the inventory model may be simplified by removing the time step index. However, the transition function $\phi^{h,t}(i|j, q)$ and the cost function $c_{iq}^t$ may be aggregated across multiple time steps during the demand lead time, as described above in connection with the time independent demand.

When the time step is removed, inventory planner 110 utilizes the following model.

$$\min \sum_{i\in I} \sum_{q\in Q} c_{iq} x_{iq} \quad (16)$$

$$\sum_{q\in Q} x_{iq} - \sum_{j\in I} \sum_{q\in Q} \phi(i|j, q) x_{jq} = 0 \quad \forall i \in I \quad (17)$$

$$\sum_{i\in I} \sum_{q\in Q} x_{iq} = 1 \quad (18)$$

$$x_{iq} \geq 0 \quad \forall i \in I, \forall q \in Q \quad (19)$$

The solution of this model, which represents the probability of being in a certain state, is not time-dependent since time step is omitted in this model. Therefore, an inventory policy generated according to the solution of this model may comprise a stationary policy.

At activity 310, inventory planner 110 solves the generated models. According to embodiments, the generated models are solved by one or more of LP and MILP solvers.

At activity 312, the solution of the generated models may be used to generate an inventory policy. The inventory policy may comprise an (s, S) inventory policy that defines an optimal action for each possible inventory state. According to some embodiments, the inventory policy is generated by calculating a resulting state after an order action is applied for all inventory states where an order action is greater than 0 and starting from the inventory state 0. The resulting state may be defined as S. The minimal state among the generated state with an order action greater than 0 may be defined as s. Based on the list of actions per states such as equation 20, which defines pairs of (inventory state, order action), the following procedure obtains the stationary policy.

$$\pi = \begin{matrix} -2 & -1 & 0 & 1 & 2 & 3 \\ [5 & 4 & 3 & 2 & 0 & 0] \end{matrix} \quad (20)$$

```
1:  procedure RETRIEVE STATIONNARY POLICY(I, π)
2:      for i ∈ I do
3:          if i ≥ 0 and π_i > 0 then
4:              big_s ← i + π_i
5:              small_s ← i
6:              return (small_s, big_s)
7:          end if
8:      end for
9:  end procedure
```

At activity 314, inventory planner 110 transforms the supply chain based, at least in part, on the generated inventory policy. By way of example and not limitation, inventory planner 110 may cause a supplier or distribution center to ship one or more products, a manufacturer to manufacture one or more products, and/or a retailer to receive one or more products to replenish a depleted inventory.

Reference in the foregoing specification to "one embodiment", "an embodiment", or "another embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:
1. A system, comprising:
a computer comprising a processor and a memory, the computer configured to:
  generate one or more transitional matrices comprising a supply leadtime;
  generate one or more reward matrices comprising cost components;
  model a supply chain planning problem as a Markov decision process (MDP) based, at least in part, on the generated one or more transitional matrices and the generated one or more reward matrices;
  solve the MDP, by:
    determining, from solution values where an order quantity is zero, a resulting state after an order action is applied;
    generating from the solution values, indices comprising a minimal state and a target state;
  generate an inventory policy based, at least in part, on the solution of the modeled supply chain planning problem wherein the computer adjusts inventory levels of at least one stocking point and adjusts sourcing of one or more supply chain entities, based at least in part, on the inventory policy; and in response to and based, at least in part, on the inventory policy, cause the one or more supply chain entities to ship one or more items.

2. The system of claim 1, wherein the computer generates the one or more transitional matrices by:
generating a set of inventory states comprising a maximum possible demand and a maximum inventory quantity; and
setting a probability of staying in state s equal to a probability of not having a demand, and setting a probability of moving from state s equal to a probability of having d demand.

3. The system of claim 2, wherein the computer is further configured to:
when the supply chain planning problem is modeled according to a time dependent model, parameterize the one or more transitional matrices by a probability associated with the supply leadtime; and
when the supply chain planning problem is modeled according to a time independent model, aggregating the one or more transitional matrices according to the probability associated with the supply leadtime.

4. The system of claim 3, wherein the computer generates the one or more reward matrices by:
associating a cost with each inventory state i for each ordering action q at a time step t.

5. The system of claim 4, wherein the cost comprises one or more of inventory cost, order cost, and stockout cost.

6. The system of claim 5, wherein a target service level is modeled as a penalty and added to the cost of the one or more reward matrices.

7. A method, comprising:
generating, by a computer comprising a processor and a memory, one or more transitional matrices comprising a supply leadtime;
generating, by the computer, one or more reward matrices comprising cost components;
modeling, by the computer, a supply chain planning problem as a Markov decision process (MDP) based, at least in part, on the generated one or more transitional matrices and the generated one or more reward matrices;
solving the MDP, by:
determining, by the computer, from solution values where an order quantity is zero, a resulting state after an order action is applied;
generating, by the computer, from the solution values, indices comprising a minimal state and a target state;
generating, by the computer, an inventory policy based at least in part, on the solution of the modeled supply chain planning problem wherein the computer adjusts inventory levels of at least one stocking point, based at least in part, on the inventory policy and adjusts sourcing of one or more supply chain entities; and
in response to and based, at least in part, on the inventory policy, cause, by the computer, one or more items to be shipped from an inventory.

8. The method of claim 7, wherein generating the one or more transitional matrices comprises:
generating, by the computer, a set of inventory states comprising a maximum possible demand and a maximum inventory quantity; and
setting, by the computer, a probability of staying in state s equal to a probability of not having a demand, and setting a probability of moving from state s equal to a probability of having d demand.

9. The method of claim 8, wherein the method further comprises:
when the supply chain planning problem is modeled according to a time dependent model, parameterize, by the computer, the one or more transition matrices by a probability associated with the supply leadtime; and
when the supply chain planning problem is modeled according to a time independent model, aggregating, by the computer, the one or more transition matrices according to the probability associated with the supply leadtime.

10. The method of claim 9, wherein generating the one or more reward matrices comprises:
associating, by the computer, a cost with each inventory state i for each ordering action q at a time step t.

11. The method of claim 10, wherein the cost comprises one or more of inventory cost, order cost, and stockout cost.

12. The method of claim 11, further comprising:
modeling, by the computer, a target service level as a penalty; and
adding, by the computer, the penalty to the cost of the one or more reward matrices.

13. A non-transitory computer-readable medium embodied with software, the software when executed is configured to:
generate one or more transitional matrices comprising a supply leadtime;
generate one or more reward matrices comprising cost components;
model a supply chain planning problem as a Markov decision process (MDP) based, at least in part, on the generated one or more transitional matrices and the generated one or more reward matrices;
solve the MDP, by:
determining, from solution values where an order quantity is zero, a resulting state after an order action is applied;
generating from the solution values, indices comprising a minimal state and a target state;
generate an inventory policy based at least in part, on the solution of the modeled supply chain planning problem wherein a computer adjusts inventory levels of at least one stocking point, based at least in part, on the inventory policy and adjusts sourcing of one or more supply chain entities; and
in response to and based, at least in part, on the inventory policy, cause one or more items to be shipped from an inventory.

14. The non-transitory computer-readable medium of claim 13, wherein the software generates the one or more transitional matrices by:
generating a set of inventory states comprising a maximum possible demand and a maximum inventory quantity; and
setting a probability of staying in state s equal to a probability of not having a demand, and setting a probability of moving from state s equal to a probability of having d demand.

15. The non-transitory computer-readable medium of claim 14, wherein the software is further configured to:
when the supply chain planning problem is modeled according to a time dependent model, parameterize the one or more transition matrices by a probability associated with the supply leadtime; and
when the supply chain planning problem is modeled according to a time independent model, aggregate the one or more transition matrices according to the probability associated with the supply leadtime.

16. The non-transitory computer-readable medium of claim 15, wherein the software generates the one or more reward matrices by:
   associating a cost with each inventory state i for each ordering action q at a time step t.

17. The non-transitory computer-readable medium of claim 16, wherein the cost comprises one or more of inventory cost, order cost, and stockout cost.

18. The non-transitory computer-readable medium of claim 17, wherein the software is further configured to:
   model a target service level as a penalty; and
   add the penalty to the cost of the one or more reward matrices.

* * * * *